US011314702B2

(12) United States Patent
Seiler, III et al.

(10) Patent No.: US 11,314,702 B2
(45) Date of Patent: Apr. 26, 2022

(54) SYSTEMS AND METHODS FOR PRODUCING INCREMENTAL REVISED CONTENT

(71) Applicant: Cengage Learning, Inc., Boston, MA (US)

(72) Inventors: Walter Michael Seiler, III, Plymouth, MI (US); Douglas Mealing, Sinking Spring, PA (US)

(73) Assignee: Cengage Learning, Inc., Boston, MA (US)

( * ) Notice: Subject to any disclaimer, the term of this patent is extended or adjusted under 35 U.S.C. 154(b) by 0 days.

(21) Appl. No.: 16/867,912

(22) Filed: May 6, 2020

(65) Prior Publication Data
US 2020/0364191 A1    Nov. 19, 2020

Related U.S. Application Data

(60) Provisional application No. 62/848,154, filed on May 15, 2019.

(51) Int. Cl.
| G06F 16/00 | (2019.01) |
| G06F 16/18 | (2019.01) |
| G06F 16/176 | (2019.01) |
| G09B 5/12 | (2006.01) |
| G06F 16/11 | (2019.01) |

(52) U.S. Cl.
CPC ........ *G06F 16/1873* (2019.01); *G06F 16/128* (2019.01); *G06F 16/1774* (2019.01); *G09B 5/12* (2013.01)

(58) Field of Classification Search
CPC .. G06F 16/176; G06F 16/1873; G06Q 10/101
See application file for complete search history.

(56) References Cited

U.S. PATENT DOCUMENTS 5,146,552 A * 9/1992 Cassorla ............... G06F 40/169
715/234
9,817,805 B1 * 11/2017 Markman .............. G06Q 10/10
(Continued)

*Primary Examiner* — Ajith Jacob
(74) *Attorney, Agent, or Firm* — Goodwin Procter LLP

(57) ABSTRACT

A method and system for incrementally revising designated portions of content contained in a medium to provide a new edition and/or a revised edition of the medium, the method including assigning a unique identifier to each element of the content contained in the source version; creating for each element of the content, at least one of a change set file, a logical content store file, or a definition file; receiving from a first author a first modification to a discrete portion of the content, the first modification further comprising: a logical intent of the first author for the first modification, a purpose of the first author for the first modification, or a goal of the first author for the first modification; storing the first modification in a corresponding first change set file; receiving from a second author a second modification to the discrete portion of the content, the second modification further comprising: a logical intent of the second author for the second modification, a purpose of the second author for the second modification, or a goal of the second author for the second modification; storing the second modification in a corresponding second change set file; and merging the first change set file and the second change set file into the medium.

20 Claims, 6 Drawing Sheets

(56) References Cited

U.S. PATENT DOCUMENTS

| | | | | |
|---|---|---|---|---|
| 2004/0215646 | A1* | 10/2004 | Kaler | G06F 8/71 |
| 2005/0234943 | A1* | 10/2005 | Clarke | H04L 67/38 |
| 2006/0259524 | A1* | 11/2006 | Horton | G06Q 10/00 |
| 2007/0260996 | A1* | 11/2007 | Jakobson | G06F 40/197 |
| | | | | 715/781 |
| 2009/0313331 | A1* | 12/2009 | Rasmussen | G06F 40/197 |
| | | | | 709/205 |
| 2010/0004944 | A1* | 1/2010 | Palaniappan | G06Q 10/10 |
| | | | | 705/1.1 |
| 2012/0023170 | A1* | 1/2012 | Matignon | G06Q 10/0637 |
| | | | | 709/205 |
| 2013/0218854 | A1* | 8/2013 | Mungi | G06F 16/10 |
| | | | | 707/697 |
| 2014/0059025 | A1* | 2/2014 | Flisakowski | G06F 16/50 |
| | | | | 707/695 |
| 2016/0048486 | A1* | 2/2016 | Lopategui | G06F 40/197 |
| | | | | 715/229 |
| 2017/0220546 | A1* | 8/2017 | Codrington | G06F 3/0484 |
| 2017/0277905 | A1* | 9/2017 | Bjorg | G06F 3/0486 |

\* cited by examiner

SYSTEMS AND METHODS FOR PRODUCING INCREMENTAL REVISED CONTENT

CROSS-REFERENCE TO RELATED APPLICATIONS

This application claims the benefit of and priority to U.S. Provisional Patent Application No. 62/848,164 filed on May 15, 2019, the contents of which are incorporated in its entirety herein by reference.

FIELD OF THE INVENTION

The present invention relates to methods and systems for providing digital derivatives of instructional material and, more specifically, to methods and systems for providing continuously-updated digital derivatives.

BACKGROUND OF THE INVENTION

Creating revisions or editions of a textbook or other bound educational material is expensive and time intensive. Indeed, updating instructional material is difficult because the content is intertwined between the sections of the book, the summaries, sidebars, forematter, back-matter, end of chapter questions, and so forth. The difficulties increase with supplemental materials like presentations, videos, quizzes, tests, and other material.

Traditional editorial systems do not address the difficulty of intertwined material. For example, existing editing methods focus on versioning content objects and elements, in which the content is revised, marked up, and compared to previous versions. These systems, however, do not support comprehensive coupling of content such as, for example, questions referencing the narrative located at the end of a chapter. While some programs automatically produce and update footnotes, tables of content, indices, and the like, these only address navigation and are limited in their effectiveness.

For example, a pedagogue, professor, instructor, or the like (generally referred to herein as a "professor") may create custom content related to a publication and may wish to retain her customization when adopting a new edition of the publication. However, publishers/editors typically update and enhance textbooks and professors or the like typically customize and enhance the publisher's products independent of the publisher as well as independent of each other—thus resulting in branched content. Thus, changes made by the publisher and by each professor are done in isolation from each other with neither group having access to or a means to review, select or implement the other's changes in the short term. However, over time, these two versions need to be combined to get the benefits of each group's work—traditionally a very difficult process.

Conventionally, professors customize their course materials and use the materials for a few years, and often add customizations each year. Subsequently, the publisher may release a new edition of the textbook, a digital learning solution, or an instruction set, leaving it up to the professor, instructor, or the like either to reject the new edition—thereby denying their students the latest edition from the publisher—or adopt the new edition—thus resulting in either losing their customizations or having to manually duplicate their customizations in the new edition so that the new edition includes their customizations—neither of which represent an optimal solution. Because the merging of customizations by professor with new content in a new edition is not supported by conventional systems, publishers and professors have been forced to either forgo customizations to the products to the detriment of the student, isolate the customizations the publisher makes from those made by the professor use outdated and inferior editions, or spend significant time and money reimplementing revisions. Traditional editorial systems do not address the difficulty of merging changes by different sources, instead focusing on versioning or branching and not converging these changes together.

Historically, in practice, a professor, an institution, and/or the editor/publisher may have each created derivative versions of a particular publication. Publishers have created derivative products for centuries, an example of which is referred to as a "traditional split." For example, *The Bible* may be purchased as a single book comprising the Old and New Testaments. Alternatively, it may be purchase as an Old Testament or as a New Testament; hence, the book is "split" into parts. Similarly, a book on economics may be bought it two parts, one comprising micro-economics and the other macro-economics. These splits include significant content that is the same to both micro-economics and macro-economics, however, some content may be unique such as page numbers, chapter numbers, chapter titles, and some content in the text may be different due to the changes needed. Other forms of derivative products may include, for example, making a specific version of the product for a specific market such as a calculus text being used as the source/basis for a Calculus for Business Majors product, or a semester-by-semester version (e.g., Calculus 1, 2 and 3).

Frequently, publishers may take the original source work and make a copy and change the content for the derivative product. This works very well to create an initial derivative product, but issues arise when the source product is later changed, or a new edition is released. While many of those source changes might flow to the derivative product, others may not. Traditionally publishers have had to either make every change twice and risk missing a change or make a copy of the new edition of the source and make a new derivative from scratch.

In other examples, digital derivatives can be created. These derivatives include, for example, altering a book or course based on a small market need such as specialty courses (e.g., Calculus for Business), university specific edition, or other niche that is made possible by the reduced costs associated with digital production and publishing. These are often differentiated to include and exclude some course outcomes based on the objectives and using alternate materials based on the subject. In some instances, an institution (e.g., a college, a university, or the like) may create a specific master version for their classes by altering the course to exclude some material and adding additional material to cover their unique curriculum and course outcomes. This may include new material, material from other publications, or institution proprietary material. In some embodiments, individual instructors may create derivatives, which in turn can be selectively propagated into new versions.

The result of these limitations of established solutions is that new editions and revisions of textbooks often experience a relatively long delivery time, a more costly development process, and large quality assurance efforts to detect and correct errors caused by the coupled content not being updated or being changed incorrectly. Moreover, the integration of revisions with supplemental content is not contemplated by these conventional techniques.

SUMMARY OF THE INVENTION

To address these challenges, the techniques and supporting systems described herein provide a significantly richer, smoother, and more accurate process for delivering continuously-available editions of content, regardless of the source (or sources) of the changes. Embodiments of the invention capture actual edits to text (or other media); store these changes as change sets; store business rules related to the content in a logical content store, separate edits from the actual content; and manage metadata related to the content and the associations among the pieces of content as content-specific definition files. As a result, users may detect changes and understand how changes to specific elements of content affect other elements of content.

In addition, according to some embodiments, multiple edits may be merged across content based on the author's intention of the change as identified in the corresponding change set using a defined workflow initiated from the logical content store. Merges use globally unique IDs (every asset has a unique identifier), content intentions (the purpose of the content), and the change set intentions (why the author made the change) to determine what has changed, the usage intent, and the merge intention to determine how to execute or perform the merge or if the change requires human intervention (the information provides a richer context of what has changed, when it was changed, the source of the change, and the intention(s) of the changer(s)).

If necessary, related content may then be updated based on the associations identified in the definition files. Continuous content updating, as described herein, also facilitates efficient product review process activities (including proofreading, editorial review, rights clearing, copyright protection, quality control, quality assurance, legal compliance, and other processes). Historically, these activities are executed sequentially and individually for each incremental update and, thus, require the full product to be reviewed. According to some embodiments of the invention, however, only those content portions that require review as identified by the definition files require review and individuals (e.g., content editors, proofreaders, etc.) performing the reviews are provided guidance as to the nature of review based on the changes made and the author's intention as stored in each change set.

In a first aspect, the present invention relates to a method for incrementally revising designated portions of content contained in a medium, such as a source version containing the content, to provide a new edition and/or a revised edition of the medium. In some embodiments, the method includes the steps of assigning a unique identifier to each element of the content contained in the source version; creating for each element of the content a change set file, a logical content store file, and/or a definition file; receiving from a first author (e.g., an author, an editor, or a publisher) a first modification to a discrete portion of the content, the first modification further including a logical intent of the first author for the first modification, a purpose of the first author for the first modification, and/or a goal of the first author for the first modification; storing the first modification in a corresponding first change set file; receiving from a second author (e.g., a professor) a second modification to the discrete portion of the content, the second modification further including a logical intent of the second author for the second modification, a purpose of the second author for the second modification, and/or a goal of the second author for the second modification; storing the second modification in a corresponding second change set file; and merging the first change set file and the second change set file into the medium.

In some implementations, one of the first author and the second author approves the merge. In some variations, receiving from the first author of the first modification to the discrete portion of the content further may include identifying the discrete portion of the content using the unique identifier assigned to the element of the content and/or receiving from the second author the second modification to the discrete portion of the content may include identifying the discrete portion of the content using the unique identifier assigned to the element of the content. In some applications, merging the first change set file and the second change set file into the medium may include identifying all modifications associated with the unique identifier assigned to the element of the content. In some implementations, modification to a discrete portion of the content may include indicia of the content being changed, indicia of why the content is being changed, a usage intent of the author, and/or a change intent.

In some variations, the logical content store file separates content from business rules applied to the content. The definition file may include metadata about the content, associations between content and other content within the definition file, and associations between content and content within another definition file.

In a second aspect, the present invention relates to a system for updating a source version of a medium containing content to provide a new edition and/or a revised edition of the medium. In some embodiments, the system may include a data storage medium for storing executable instructions and at least one computer processor capable of executing the instructions to perform operations that may include assigning a unique identifier to each element of the content contained in the source version; creating for each element of the content a change set file, a logical content store file, and/or a definition file; receiving from a first author (e.g., an author, an editor, or a publisher) a first modification to a discrete portion of the content, the first modification further including a logical intent of the first author for the first modification, a purpose of the first author for the first modification, and/or a goal of the first author for the first modification; storing the first modification in a corresponding first change set file; receiving from a second author (e.g., a professor) a second modification to the same discrete portion of the content, the second modification including a logical intent of the second author for the second modification, a purpose of the second author for the second modification, and/or a goal of the second author for the second modification; storing the second modification in a corresponding second change set file; and merging the first change set file and the second change set file into the medium.

In some implementations, one of the first author and the second author approves the merge. In some variations, receiving from the first author of the first modification to the discrete portion of the content further may include identifying the discrete portion of the content using the unique identifier assigned to the element of the content and/or receiving from the second author the second modification to the discrete portion of the content may include identifying the discrete portion of the content using the unique identifier assigned to the element of the content. In some applications, merging the first change set file and the second change set file into the medium may include identifying all modifications associated with the unique identifier assigned to the element of the content. In some implementations, modification to a discrete portion of the content may include indicia of what content is being changed, indicia of why the content is being changed, a usage intent of the author, and/or a change intent.

In some variations, the logical content store file separates content from business rules applied to the content; the definition file includes metadata about the content, associations between content and other content within the definition file, and associations between content and content within another definition file.

BRIEF DESCRIPTION OF THE FIGURES

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF THE INVENTION

Figure 1:
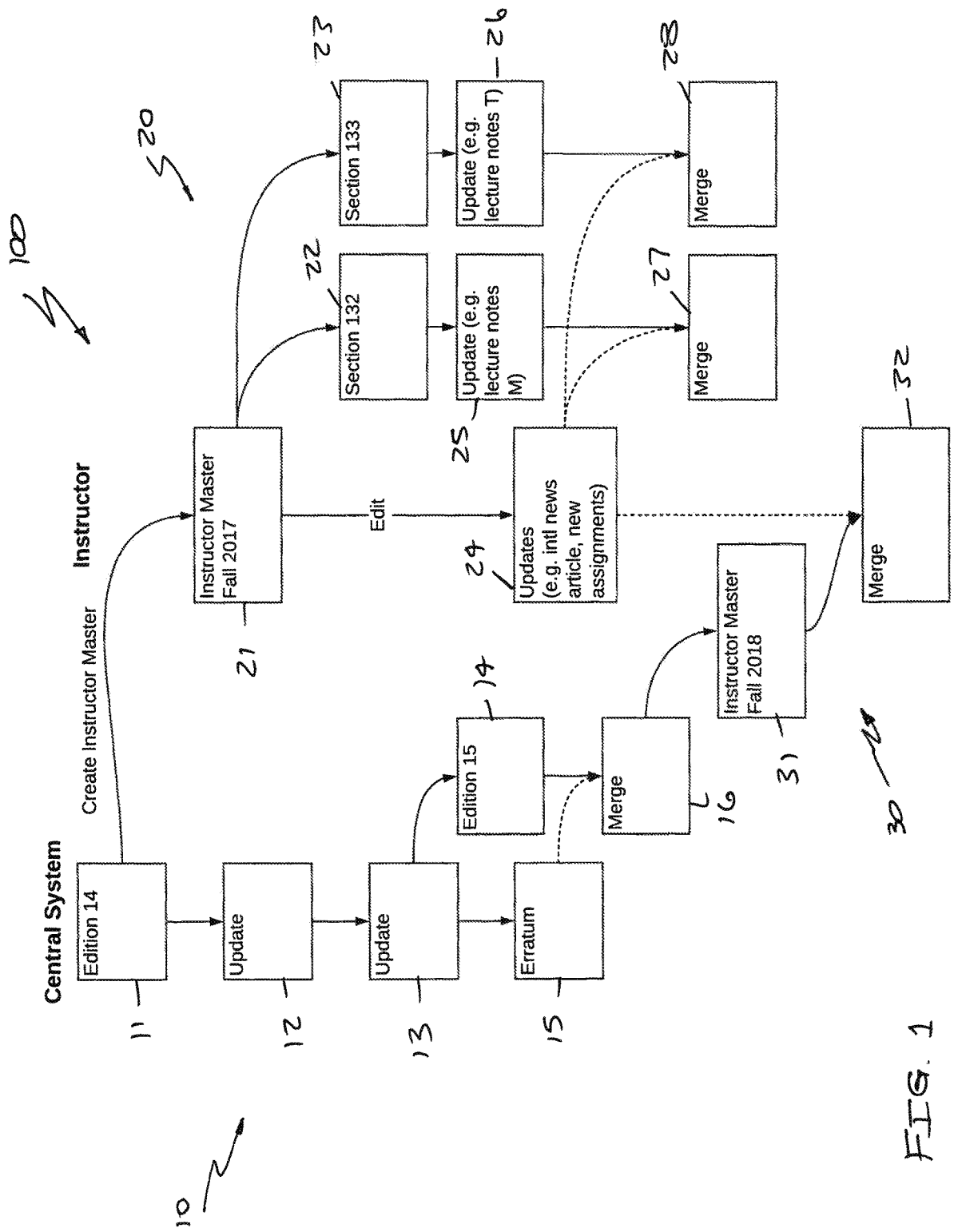
FIG. 1 illustrates an example of a workflow for creating digital derivatives of content in accordance with various embodiments of the invention.

Referring to FIG. 1, an environment 100 (e.g., a logic flow) for producing a complex derivative work 30 that may be periodically and in some cases continuously-updated by multiple contributor parties (e.g., authors, publishers, editors, professors, and the like) to include changes, errata, problem sets, and the like from multiple sources 10, 20 is shown. In some applications, the environment 100 may include a central content and version control system 10 that provides editing and publishing functions for a population of authors, as well as a remote version control system 20 that provides updates, problems sets, quizzes, tests, presentations, and the like that may be created by the users (e.g., professors) of the work. Whereas the former system 10 may update and enhance the derivative work 30 for all actual or potential users, the latter system 20 may customize and enhance the publisher's products independent of other users. This may be referred to as branching of the content: changes made by the author, editor, publisher, and the like 10 that are meant to apply to all users 20 and changes made by individual and discrete users 20, in the short term, that may be isolated from one another, such that neither system 10, 20 handles the changes of the other. Eventually, the branched versions of the derivative work 30 need to be combined or merged so that each group in the individual systems 10, 20 may benefit from the work of the other. Advantageously, the editing and publishing process supports repeated and rapid revision and versioning in an educational setting, thereby allowing instructors, professors, students, and the like to create and receive updated versions of textbooks, problem sets, and other educational materials.

In some embodiments, the environment 100 may include a central system 10 that includes content that is controlled by, for example, an editor, a publisher, an author, or the like as well as a remote system 20 that includes content that is controlled by, for example, a professor. In some variations, the central system 10 may provide (e.g., publish) a first version 11 of the content ("Edition 14") that may serve as the basis for subsequent versions and updates. In some instances, with time, the central system 10 may create an additional or a new version 14 ("Edition 15") of the content to account for various updates 12, 13, errata 15, new material, and so forth. For example, as shown in FIG. 1, after two updates 12, 13 to the first version 11 of the content ("Edition 14"), an interim, revised edition 14 ("Edition 15") may be created. Before the interim, revised edition 14 is distributed, however, further errata 15 to the content may be merged 16 with the revised version 14 ("Edition 15") post-publication. The post-publication revised version 14 ("Edition 15") merged with errata 15 may then be published and made available to remote users as a derivative work 30.

Remote from the central system 10 of the publisher/editor, the published first version 11 of the content ("Edition 14") may then be delivered, e.g., as an instructor master edition 21 ("Instructor Master Fall 2017"), for use by a plurality of professors. Whereas publishers/editors 10 are able to update and enhance the latest version of the content so that the latest version of the content made available for use is uniform regardless of the recipient/user, a plurality of remote users (e.g., professors) may independently enhance and customize the instructor master edition 21 that the users receive from the publisher/editor 10.

In some variations, individual professors or various departments within the institution may select to use materials associated with the instructor master edition 21 as the textbook for more than one course. For example, a single instructor master edition 21 on economics may be used as the basis for a first course 22 in microeconomics ("Section 132") and as the basis for a second course 23 in macroeconomics 23 ("Section 133"). The first course 22 and the second course 23 may be taught by the same professor or may be taught by a different professor. For many required courses, multiple professors may also teach different sections of the same course 22, 23, e.g., using the same instructor master edition 21. For example, a first section may meet on Mondays, Wednesdays, and Fridays ("MWF"), while a second section may meet on Saturdays.

In turn, the departments using the instructor master versions 21 and/or the professors may create their own general updates, supplements, and syllabi 24, 25, 26 that correlate with and supplement the content in the current instructor master version 21. For example, in some instances, a department using the instructor master version 21 may choose to update 24 the master version 21, e.g., to include new assignments, design projects, recent news articles, and so forth. Furthermore, individual professors may merge 27, 28 their personal lecture notes, updates, supplements, etc. 25, 26 to present the content in a manner that is consistent with the organization and structure of the instructor master edition 21 or consistent with their own teaching preferences and style. Thus, within any remote system 20, e.g., an institution of higher learning, the same professor may create notes, updates, problem sets and other materials 25, 26 for different classes 22, 23, even though the same base edition 21 is used as the textbook.

Advantageously, when new versions of the content are created, these notes, updates and supplemental materials 25, 26 may be integrated with, merged into, and correlated across versions 27, 28. In other instances, instructors create notes, problems sets, section-specific material (e.g., more complex material for a college-prep class versus more basic materials for an introductory class) and other additional material to supplement the publisher's version 11. Advantageously, when the central system 10 creates a derivative work 30, notes, updates and supplemental materials 25, 26 from the remote system 20 that have been integrated with, merged into, and correlated across versions 27, 28 may then be merged 31 with the derivative work.

Figure 2A:
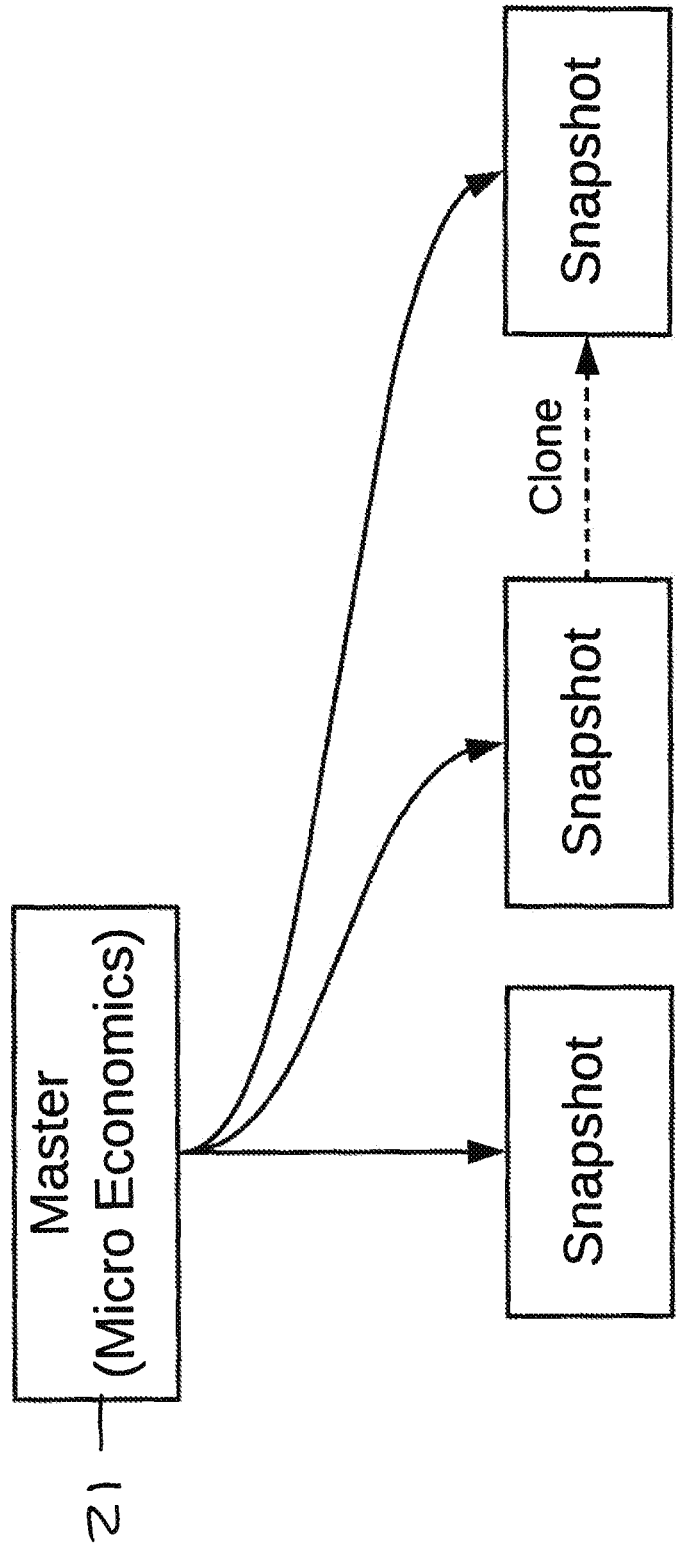
FIGS. 2A and 2B illustrate an example of a particular set of content as it is revised in the central system (2A) and the remote system (2B) accordance with various embodiments of the invention.
Figure 2B:
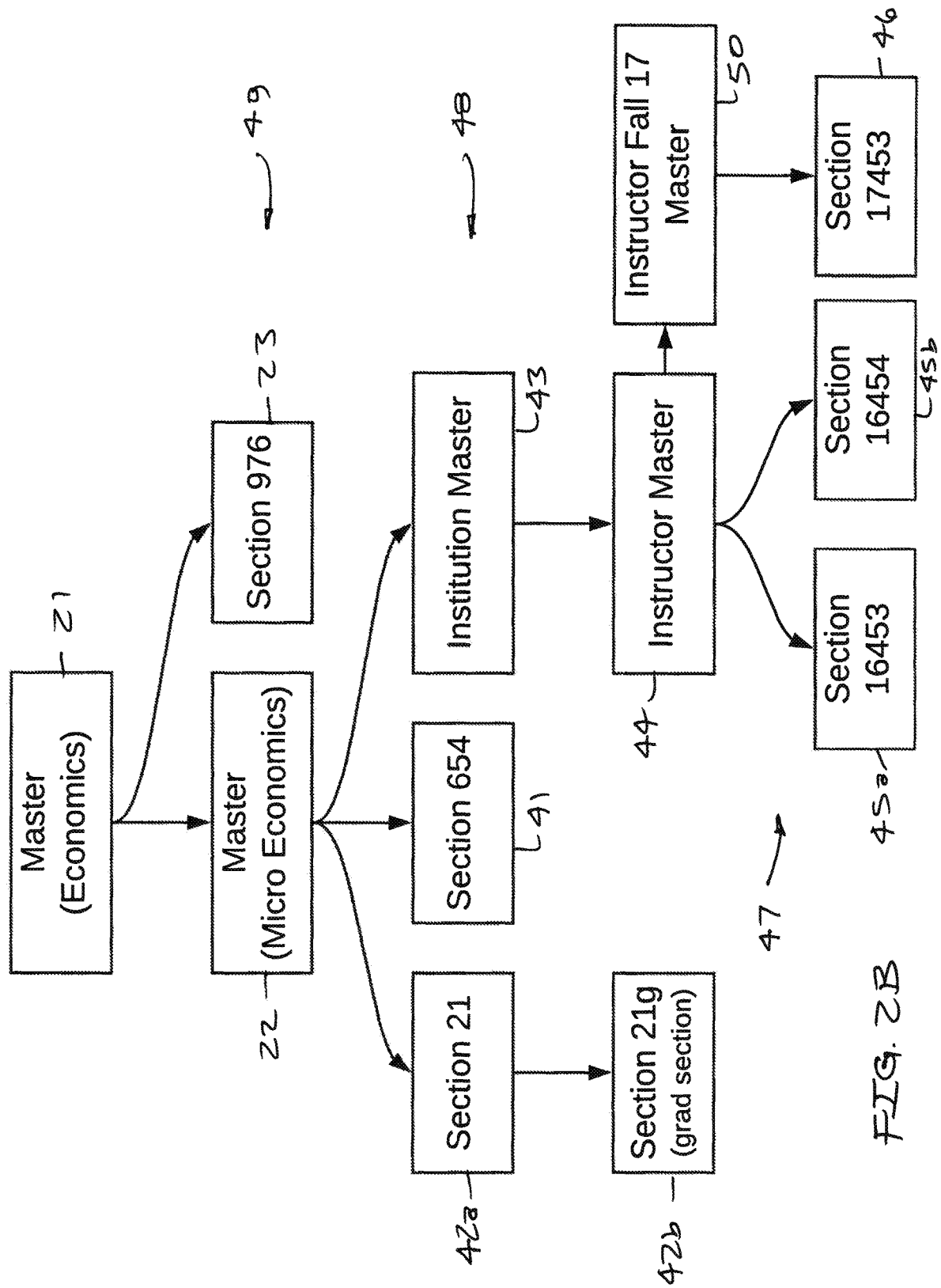

FIGS. 2A and 2B provide an illustrative embodiments of how the above process may be applicable to content, which, for the purpose of illustration rather than limitation, may be taken as an economics textbook 21 and, more preferably, a single master version 21 of an economics textbook from which different versions of the master version 21 may be created for different variants 49 of the master version 21. For example, a first level of variants 49 may involve course topics (e.g., micro-economics 22 versus macro-economics 23), a second level of sub-variants 48 for the micro-economics course 22 may involve, for example, different sections 41, 42a, 42b and/or different times when the courses may be available (e.g., fall semester, spring semester, etc.) and/or whether the course is an undergraduate level course 42a or a graduate level course 42b. Irrespective of the variant 49 and sub-variant 48, separate institution masters 43 may be created for each variant 49 and/or sub-variant 48.

As shown in FIG. 2B, in the remote system 20, several instructor master versions 44, 50 of the published institution master version 43 are shown. A first instructor master version 44 may belong to Professor Jones, who in the current Fall term of the current school year (e.g., 2016) may be teaching multiple (e.g., two) sections: "Section 16453" 45a, which is Professor Jones's MWF class, and "Section 16454" 45b, which is Professor Jones's Saturday class. A second instructor master version 50, which may be a derivative of the first instructor master version 44, may also belong to Professor Jones for the Fall semester in 2017 for which Professor Jones may be teaching s single section: "Section 17453" 46, which is a future MWF class. Thus, from the Institution Master version 43, Professor Jones may have an Instructor Master version 44 that she may use to make changes and modifications that may be applied to all texts and all of her courses 45a, 45b, 46, as well as versions of the Instructor Master version 44 for each of Section 16453 45a, Section 16454 45b, and Section 17453 46. This allows Professor Jones to have a version of her Instructor Master version 44 that includes, for example, special materials, a syllabus, and assignment due dates for her current MWF class (i.e., Section 16453 45a); special materials, a collapsed syllabus, and assignment due dates for her Saturday class (i.e., Section 16454 46b); and special materials, a syllabus, and assignment due dates for her Fall 2017 MWF class (i.e., Section 17453 46).

To facilitate the tracking, merging, and updating of the content for each of the remote users and for the many variants 49 and sub-variants 48, change sets, a logical content store ("LCS"), and definition files may be created. These three critical components—change sets, the logical content store ("LCS"), and definition files—combine together to provide significantly richer capabilities to facilitate continuous editions as described using the various use cases below.

Change sets capture the physical edits of the author, as well as the logical intent, purpose, and goal of the author for making the change. As such, change sets transcend the obvious physical changes between version A and version B of a publication, including the intent of the author of the change (e.g., why one instructor wants to eliminate or suppress a whole chapter or certain pages or paragraphs in a chapter of the master version 21. "Author" as used in the change set context may refer to the author of the master edition 21 as well as to any of the remote users who may make changes to the master edition 21. This makes the change set dramatically more efficient in implementing updates of content elements to be tracked, approved, deployed, and, when necessary, corrected or rolled back. Change sets may comprise a single change (e.g., replace text X with text Y) or a series of changes, such as a listing of errata found over time, and implemented in batch.

The logical content store ("LCS") is configured to separate business rules around content from the physical content storage in a content management system ("CMS"). Hence, the LCS may not, itself, provide digital storage of the assets, but, rather, separates the business logic from the content. Advantageously, such separation enhances the traceability and inheritance of the content, allowing content to be tracked, versioned, linked, and associated across content that resides in various locations. As such, the need to centralize all content in a single system to achieve central control may be eliminated—a requirement that, typically, may be unrealistic due to cost, organizational changes, market changes, and barriers created because not all content is owned or managed by any single publisher or author. The LCS thus provides key capabilities to support continuous updates to a textbook, digital learning solution, and instruction set by capturing the versions at the author's workspace and content elements with the change sets between workspace versions and links to the various CMS objects included or referenced in the workspace.

The definition files contain metadata about content, as well as an association of the content to other content and other definition file(s). For example, an activity definition file can express certain settings that are associated with the activity, what other activities are related to it, what assessment questions are involved, what content may be used to teach the material, and the instructional material that may be used to remediate a student (i.e., teach the student if he/she got answered a question incorrectly).

To implement these functions, the merge process tracks each asset or element of content using a globally unique identifier. An asset/element of content may include a keyword, an equation, a sentence, a paragraph, a photographic image, a video, a question, an answer to a question, and so forth. In some implementations, the unique identifier may be an alphanumeric number sequentially generated for the purpose of capturing a physical change to a previous edition of the master version 21, as well as capturing the intent of the change between the versions (i.e., what it was, what it is, and why the change was made). Thus, in some embodiments, every asset has a unique, two-part version identifier.

For each asset/element of content, the systems stores and tracks the content intention(s) (i.e., the purpose of the content), and the change set intention(s) (i.e., why the author made the change) to determine what has changed, the usage intent, and the change intention to determine how to do the merge or, if the change requires human intervention (e.g., the information provides a richer context of what has changed, when, by who, and intentions). For example, an asset/element of content (e.g., a photographic image) may have a unique ID of GdfihghjYG176523hjk, and a content purpose of "substantive." The change may be tracked as substantive:crop, with a merge guidance of "potential conflict" and a merge action of "human intervention."

According to the present invention, certain versions of the system track and trace change sets in order to measure the degree or amount of changes that is being applied to new editions, revisions or updates. For example, if more than some threshold amount of the content (e.g., 30%) is being revised or added, a new edition may be produced. Such thresholds may also be used to trigger copyright registration filings, updates to registration statements, or other legal processes necessary to protect rights in the content. In some instances, in which different institutions or authors may have version-specific content (e.g., problems sets, images, etc.) that are proprietary to the institution or author, only those versions created and used by those institutions should have access to or are provided with those change sets, and as such updates to such material may be restricted. As a result, the system facilitates the tracking and enforcement of individual contributors' rights in intellectual property they contribute to change sets and, eventually versions.

Figure 3:
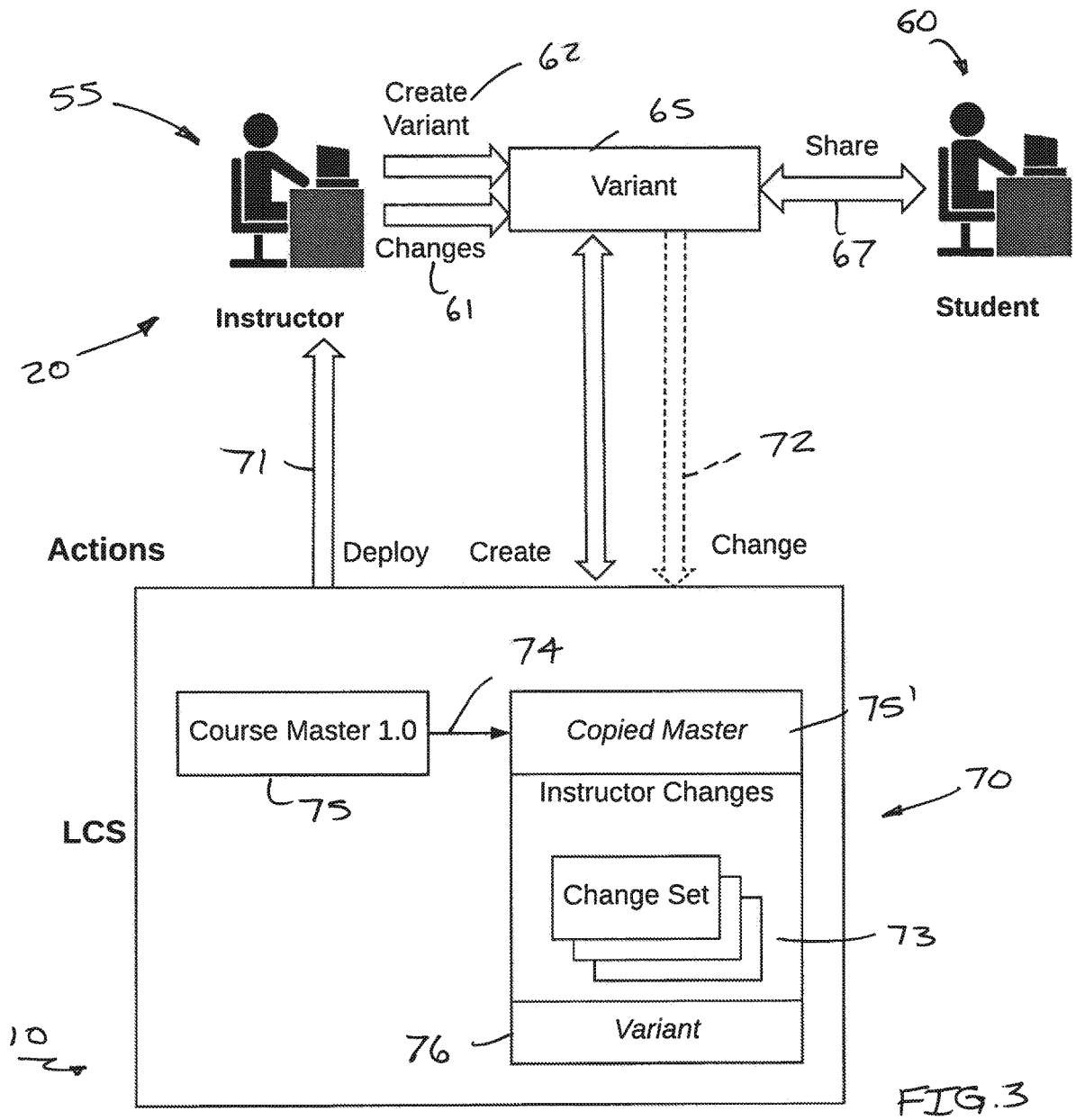
FIG. 3 illustrates the creation of a new content variant in accordance with various embodiments of the invention.

FIG. 3 provides an illustrative embodiment of the remote system 20, displaying the roles of professors 55 and students 60, collectively referred to as "users," that contribute to updated versions or derivatives, i.e., "variants," of the managed content. More specifically, FIG. 3 illustrates the actions taken, as well as the resulting content as it is stored in the LCS 70 and shared 67 with the students 60. For example, after the central system 10 (e.g., the publisher/editor) deploys or publishes 71 a course master edition ("Course Master 1.0") 75, the deployed or published course master edition 75 may be copied 74 (e.g., as a "Copied Master" version 75') into the LCS 70.

In the remote system 20 (FIG. 1), the user(s) 55, 60 may identify changes 61 (e.g., additions, deletions, updates, additional course material, problem sets, answers to problem sets, etc.) that she would like to make to a course master edition 75 as part of her course. Each change or set of changes 61 may create 62 a distinct variant 65 of the course master edition 75, which may be deployed to, pushed out to, or shared with 67 the students 60 for their use and consumption during the course. Advantageously, a unique identifier may be assigned to each variant 65. After receiving its unique identifier, the change 72 of the variant 65 may be stored 72 in a change set 73 in the LCS 70 according to an appropriate definition file. In some variations, the definition file provides instructions as to how individual pages in the variant 76 are to be assembled (e.g., where an image is to appear on the page, which video is to be shown and under what circumstances, and the like). Preferably, in addition to the unique identifier, each change set 73 may include an explanation as to why the author 55, 60 wants to change the text (e.g., to eliminate or suppress a sentence, paragraph, page, chapter; to conform the text to a European audience instead of an American audience, and so forth). The physical data pertaining to the change set 73 may be stored in a database (e.g., in the CMS).

Figure 4:
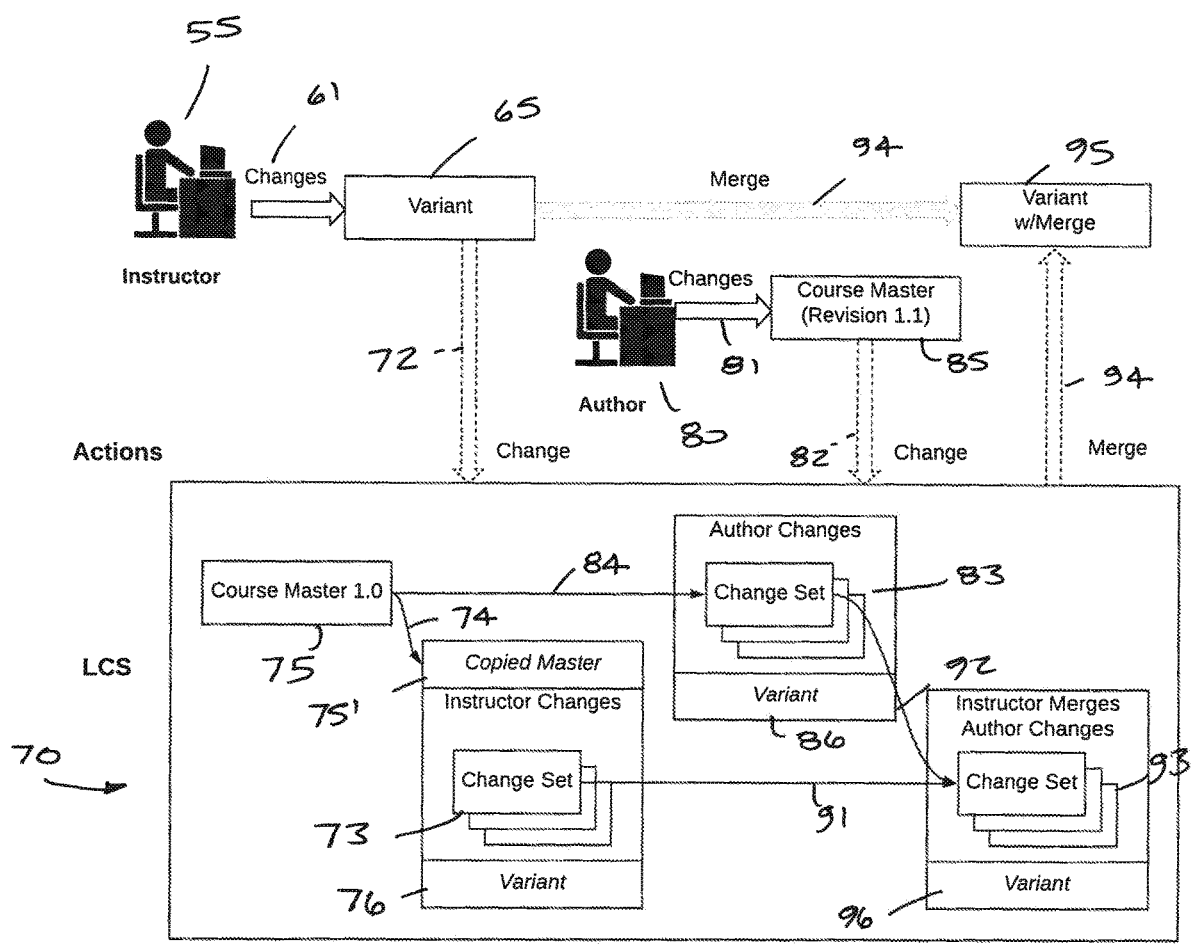
FIG. 4 illustrates the creation of a new content edition in accordance with various embodiments of the invention. The new edition is assembled by the merge of change sets to the original version or course master supporting the capability of continuous editions.

FIG. 4 provides an illustrative embodiment of the roles of authors 80 and professors 55 that may each contribute to updated versions or derivatives of the managed content. More specifically, FIG. 4 illustrates actions taken in the central system 10 and the remote system 20, as well as the resulting content from modifications made in either or both systems 10, 20. For example, as previously described in connection with FIG. 3, after the publisher/editor deploys or publishes a course master edition 75, a professor and the like 55 may identify changes 61 (e.g., additions, deletions, updates, additional course material, etc.) that she would like to make to a course master edition 75 as part of her course. Each change or set of changes 61 may create a distinct variant 65 of the course master edition 75. After receiving a unique identifier, the change 61 creating the variant 65 may be stored 72 as a change set 73 in the LCS 70 according to an appropriate definition file. In some variations, the definition file provides instructions as to how individual pages in the variant 65 are to be assembled (e.g., where an image is to appear on the page, which video is to be shown and under what circumstances, and the like). Preferably, in addition to the unique identifier, each change set 73 may include an explanation as to why the professor 55 wants to change the text (e.g., to eliminate or suppress a sentence, paragraph, page, chapter; to conform the text to a European audience instead of an American audience, and so forth). The physical data pertaining to the change set 73 may be stored in a database (e.g., in the CMS).

In the central system 10, an author 80 of the original work may also identify changes 81 (e.g., additions, deletions, updates, etc.) that she would like to make to a course master edition 75. Such changes 81 create a revision to the master edition 85 ("Revision 1.1"). After a unique identifier is assigned or attributed to each change 81, the change 81 may also be stored 82 as a change set 83 in the LCS 70 according to an appropriate definition file. The various change sets 83 in the LCS 70 in combination with the course master edition 75 produce a variant 86.

In some variations, the definition file provides instructions as to how individual pages in the revision to the master edition 85 are to be assembled (e.g., where an image is to appear on the page, which video is to be shown and under what circumstances, and the like). Preferably, in addition to the unique identifier, each change set 83 may include an explanation as to why the author 80 wants to change the text (e.g., to eliminate or suppress a sentence, paragraph, page, chapter; to conform the text to a European audience instead of an American audience, and so forth). The physical data pertaining to the change set 83 may be stored in a database (e.g., in the CMS).

At some point, preferably prior to deploying/pushing out to or sharing a derivative work with students 60 for their use and consumption during the course, the change sets 73, 83 stored in the LCS 70 may be merged 91, 92 into a combined change set 93 that includes the revised course master (i.e., Revision 1.1) 85 from the author 80 and instructor-specific changes to the course master version 75. The combined change sets 93 and the course master version 75 produce a variant 96 within the LCS 70. When a new revision 95 is published 94 based on the user's 55 and the author's 80 updates, the instructor-specific change set(s) 73 are merged with the new revision 85, using the definition files to identify the revised or added content.

Figure 5:
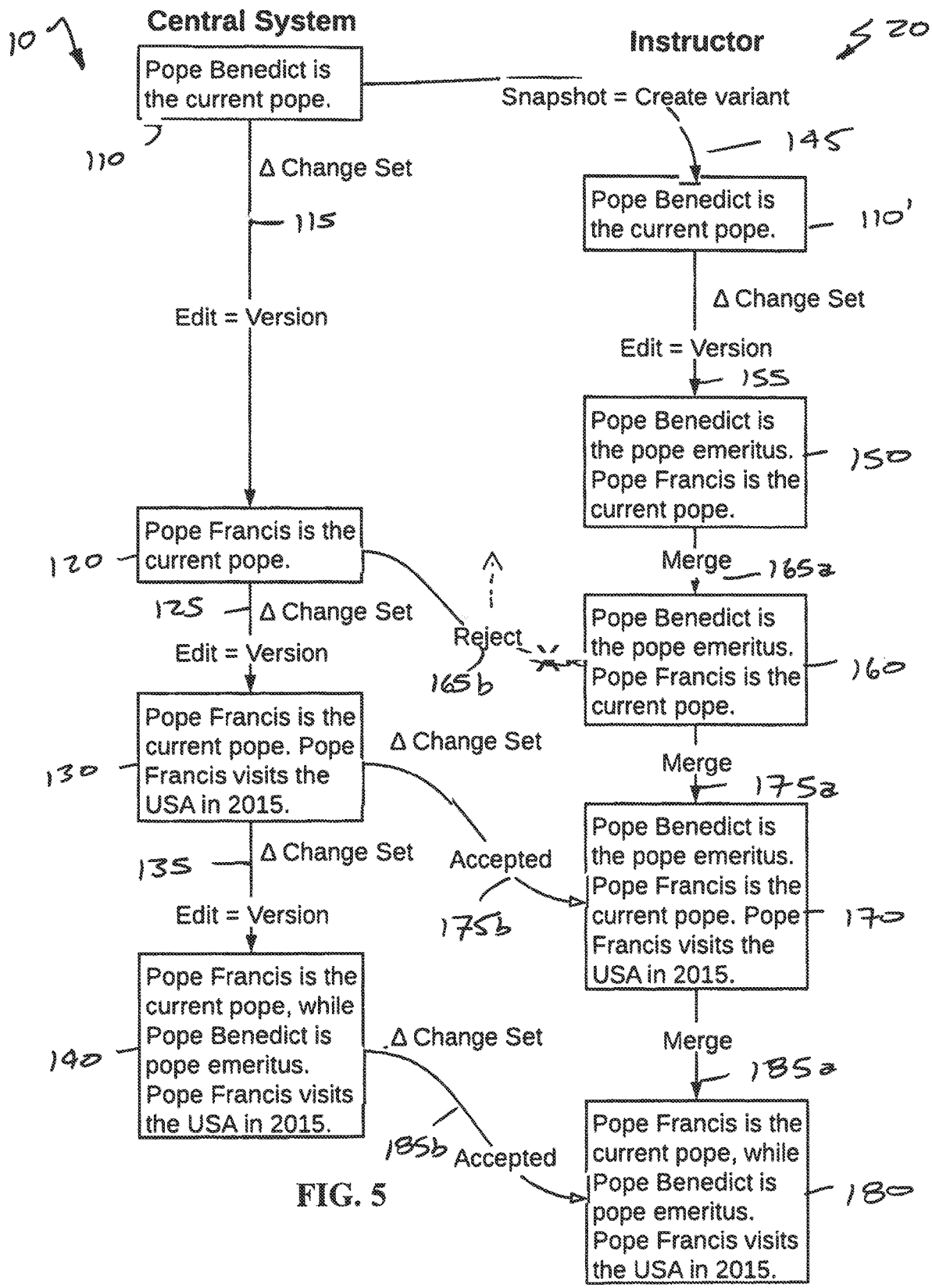
FIG. 5 is a flow chart illustrating the interaction between an author implementing changes in content and a change set that contains the changes in accordance with various embodiments of the invention.

Referring to FIG. 5, an illustrative embodiment of a flow-chart whereby professors 55 (FIG. 3) may implement real-time updates of a work based, for example, on current events is shown. The left side of FIG. 5 shows acts taken by the central system 10, while the right side of the FIG. 5 shows acts taken by the remote system 30. In a first variant 110 of the published or deployed work, the text may include a statement that "Pope Benedict is the current pope." A first change set 115 by the author 80 (FIG. 4) may produce a second variant 120 of the text, indicating that "Pope Francis is the Pope," while a second change set 125 may produce a third variant 130, indicating that "Pope Francis is the current pope" and that "Pope Francis visited the USA in 2015." Finally, a third change set 135 may produce a fourth variant 140, indicating that "Pope Benedict is the Pope Emeritus," that "Pope Francis is the current pope," and that "Pope Francis visited the USA in 2015."

From the master edition 75 (FIG. 4), the user 55 in the remote system 20 may independently publish or deploy 145 a first variant 110' stating that "Pope Benedict is the current pope." Prior to the central system 10 deploying or publishing its second variant 120, the user 55 may further amend or edit 155 his first variant 110' to create his own second variant 150, indicating that "Pope Benedict is the Pope Emeritus" and that "Pope Francis is the current pope."

Once the central system 10 has resolved its first change set 115 into its second variant 120, in the LCS 70, the central system's second variant 120 may be presented to the user 55 for the purpose of selectively merging the central system's second variant 120 with the user's second variant 150. Such presentations may result in a merge conflict or no merge conflict. A merge conflict connotes that the central system 10 and the user 55 have each made edits in the master work 75 (FIG. 4) and that the changes appear in the same place within the master work 75. As a result, a decision is required (e.g., by the user 55) as to whether the change(s) should be retained in the user's version, rejected, or overwritten. "No merge conflict" connotes that changes made by the user 55 and the central system 10 are not in the same place; hence, there is no conflict about merging the central system's variant in the user's version 75.

Because the central system's second variant 120 does not also mention that "Pope Benedict is the Pope Emeritus" the user 55 may reject or refuse 165*b* to merge the central system's second variant 120 with his own, preferring to retain his own second variant 150. As a result of this rejection, the user's second variant 150 merges into 165*a* the user's third variant 160, which remains identical or substantially identical to his second variant 150. Had the user 55 accepted the content of the central system's second variant 120, he may have, instead, agreed to merge the central system's second variant 120 with his own. In accepting the content of the central system's second variant 120, in some implementations, the user 55 may use a Web application or a computer application to accept the merge, such that the Web site or application makes a secured service call to the central system 10.

After the central system 10 has incorporated its second change set 125 into its third variant 130, the central system's third variant 130 may be presented to the user 55 for the purpose of merging the central system's third variant 130 with the user's version (i.e., the user's third variant 160). Because the central system's second variant 120 that made no mention of the Pope Emeritus was previously rejected, no attempt would be made to re-merge the rejected change 120. Indeed, in some applications, there is no attempt to re-merge previously rejected changes. As a result, the user 55 may agree 175*b* to merge 175*a* the central system's third variant 130, such that the user's fourth variant 170 includes content from the user's third variant 160 and from the central system's third variant 130.

Finally, once the central system 10 has amended its fourth variant 140, the central system's fourth variant 140 may be presented to the user 55 for the purpose of merging the central system's fourth variant 140 with the user's fourth variant 170. Because the central system's fourth variant 140 contains the same or substantially the same information as that found in the user's fourth variant 170, he may accept 185*b* the central system's fourth variant 140 merge 185*a* and the central system's fourth variant 140 with his own fourth variant 170. Hence, the user's fifth variant 180 may be identical or substantially identical to his central system's fourth variant 140.

Using these techniques, elements of content may be identified and processed as coupled content automatically across multiple versions as well as variants of each version created by individual users. Examples of coupled content include, for example, a table of contents referencing the chapter headings, an index having topics and page numbers, and content referencing footnotes with automatically generated numbers. More advanced examples include content referencing other content (e.g., links), content building on concepts previously mentioned (logical linkage), end of chapter questions referencing the narrative, content chunks linked to learning objectives, and a question having an image.

For example, a question in the text may include an image of the Eiffel Tower with a stationary red car parked in front of it; the author 80 may further classify usage of the image as "substantive" (as opposed to "illustrative" or "artistic"). "Substantive" refers to an image that is germane to the point, such as a battle map in a history topic. "Illustrative" refers to an image providing an example or clarifying the topic, such as a photo of President Obama when describing world leaders. "Artistic" refers to generic images that may be used to make things look nicer or that provide a better appearance, such as an image of three students in a lab with test tubes at the beginning of a chapter on chemistry. In a first instance, an artist may update the image to include a border and a drop shadow. Advantageously, the central system may understand the nature of the artist's change, i.e., "artistic," as well as the artist's intention (e.g., using the change set) and, as a result, the system would be able to apply the artistic change automatically, such that an image of the Eiffel tower and red car with a border and a drop shadow will be shown in conjunction with the question. In a second instance, an artist may crop the image to remove the red car. In contrast with the previous "artistic" change, the system may understand the artist's change to delete the red car to be "substantive" based on its usage and the change being significant and, furthermore, based on the amount of cropped pixels, requiring the system to flag the change, which may further require manual (e.g., human) intervention to determine whether or not to apply the image change. For example, if the text is a foreign language text and the question is asking the color of the car, the original image is required (i.e., "substantive") and the merge may be rejected. On the other hand, if the question is regarding architecture and the Eiffel tower itself, the merge request may be accepted, since the absence of the red car does not affect a correct response to the question. This occurs at the central system when the merge of the cropped image occurs.

Advantageously, some of the benefits of implementing these methods and supporting systems may include the automatic updating of certain content based on the nature of the change and/or the intention of the individual making the change, and identification of updates that require human interaction to decide on how the update may or may not be implemented, and if so, in which versions.

The subject matter described herein may be implemented in digital electronic circuitry, or in computer software, firmware, or hardware, including the structural means disclosed in this specification and structural equivalents thereof, or in combinations thereof. The subject matter described herein may be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) may be written in any form of programming language, including compiled or interpreted languages, and it may be deployed in any form, including as a stand-alone program or as a module, component, subroutine, or other unit suitable for use in a computing environment.

A computer program may not necessarily correspond to a file. A program may be stored in a portion of a file that holds other programs or data, in a single file dedicated to the program in question, or in multiple coordinated files (e.g., files that store one or more modules, sub-programs, or portions of code). A computer program may be deployed to be executed on one computer or on multiple computers at one site or distributed across multiple sites and interconnected by a communication network.

The processes and logic flows described in this specification, including the method steps of the subject matter described herein, may be performed by one or more programmable processors executing one or more computer programs to perform functions of the subject matter described herein by operating on input data and generating output. The processes and logic flows may also be performed by, and apparatus of the subject matter described herein can be implemented as, special purpose logic circuitry, e.g., an FPGA (field programmable gate array) or an ASIC (application specific integrated circuit).

Processors suitable for the execution of a computer program may include, by way of example, both general and special purpose microprocessors, and one or more processor of any kind of digital computer. Generally, a processor may be adapted to receive instructions and data from a read-only memory (ROM) or a random access memory (RAM) or both. The elements of a computer may include, for example, a processor for executing instructions and one or more memory devices for storing instructions and data. Typically, a computer may also include, or be operatively coupled to receive data from or transfer data to, or both, one or more mass storage devices for storing data, e.g., magnetic disks, magneto-optical disks, optical disks, or the like. Information carriers suitable for embodying computer program instructions and data may include all forms of nonvolatile memory, including, by way of example, semiconductor memory devices, (e.g., EPROM, EEPROM, flash memory devices, and the like); magnetic disks, (e.g., internal hard disks, removable disks, and the like); magneto-optical disks; and optical disks (e.g., CD disks, DVD disks, and the like). In some variations, the processor and the memory may be supplemented by, or incorporated in, special purpose logic circuitry.

To provide for interaction with a user, the subject matter described herein may be implemented on a computer having a display device, e.g., a CRT (cathode ray tube) or LCD (liquid crystal display) monitor, for displaying information to the user and a keyboard and a pointing device, (e.g., a mouse or a trackball), with which the user may provide input to the computer. Other kinds of input and output devices may be used to provide for interaction with a user as well. For example, feedback provided to the user may be any form of sensory feedback (e.g., visual feedback, auditory feedback, tactile feedback, and so forth) and input from the user may be received in any form (e.g., acoustic, speech, tactile input, and so forth).

The subject matter described herein may be implemented in a computing system that includes a back-end component (e.g., a data server), a middleware component (e.g., an application server), and/or a front-end component (e.g., a client computer having a graphical user interface or a web browser through which a user may interact with an implementation of the subject matter described herein), or any combination of such back-end, middleware, and front-end components. The components of the system may be interconnected by any form or medium of digital data communication, e.g., a communication network. Examples of communication networks may include a local area network ("LAN") and a wide area network ("WAN") (e.g., the Internet).

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

What we claim is:

1. A computer-implemented method for incrementally revising designated portions of content contained in a medium, the medium comprising a source version containing the content, to provide at least one of a new edition or a revised edition of the medium, the method comprising:
    assigning, by a processing device, a unique identifier to each element of the content contained in the source version;
    creating, by the processing device, for each element of the content, at least one of a change set file, a logical content store file, or a definition file;
    receiving, by the processing device, from a first author a first modification to a discrete portion of the content, the first modification further comprising: a logical intent of the first author for the first modification, a purpose of the first author for the first modification, or a goal of the first author for the first modification;
    storing the first modification in a corresponding first change set file;
    receiving, by the processing device, from a second author a second modification to the same discrete portion of the content, the second modification further comprising at least one of: a logical intent of the second author for the second modification, a purpose of the second author for the second modification, or a goal of the second author for the second modification;

storing the second modification in a corresponding second change set file; and after detecting a conflict between the first modification and the second modification, by the processing device, using the unique identifiers to merge, by the processing device, the first change set file and the second change set file into the medium using the logical intent, purpose, or goal of each of the first and second authors and the first and second change set files to resolve the conflict.

2. The method of claim 1, wherein the first author is selected from the group consisting of an author, an editor, and a publisher.

3. The method of claim 1, wherein the second author is selected from the group consisting of a pedagogue, a professor, an instructor, a teacher, a teaching assistant, and a research assistant.

4. The method of claim 1, wherein one of the first author and the second author approves the merge.

5. The method of claim 1, wherein receiving from the first author the first modification to the discrete portion of the content further comprises identifying the discrete portion of the content using the unique identifier assigned to the element of the content.

6. The method of claim 1, wherein receiving from the second author the second modification to the discrete portion of the content further comprises identifying the discrete portion of the content using the unique identifier assigned to the element of the content.

7. The method of claim 1, wherein merging the first change set file and the second change set file into the medium further comprises identifying all modifications associated with the unique identifier assigned to the element of the content.

8. The method of claim 1, wherein the logical content store file separates content from business rules applied to the content.

9. The method of claim 1, wherein the definition file comprises metadata about the content, associations between content and other content within the definition file, and associations between content and content within another definition file.

10. The method of claim 1, wherein modification to a discrete portion of the content comprises: indicia of what content is being changed, indicia of why the content is being changed, a usage intent of the author, or a change intent.

11. A system for updating a source version of a medium containing content to provide at least one of a new edition or a revised edition of the medium, the system comprising:
at least one data storage medium for storing executable instructions; and
at least one computer processor capable of executing the instructions to perform operations comprising:
assigning a unique identifier to each element of the content contained in the source version;
creating for each element of the content, at least one of a change set file, a logical content store file, or a definition file;
receiving from a first author a first modification to a discrete portion of the content, the first modification further comprising at least one of: a logical intent of the first author for the first modification, a purpose of the first author for the first modification, or a goal of the first author for the first modification;
storing the first modification in a corresponding first change set file;
receiving from a second author a second modification to the same discrete portion of the content, the second modification further comprising: a logical intent of the second author for the second modification, a purpose of the second author for the second modification, or a goal of the second author for the second modification;
storing the second modification in a corresponding second change set file; and
after detecting a conflict between the first modification and the second modification, by the computer processor, using the unique identifiers to merge the first change set file and the second change set file into the medium using the logical intent, purpose, or goal of each of the first and second authors and the first and second change set files to resolve the conflict.

12. The system of claim 11, wherein the first author is selected from the group consisting of an author, an editor, and a publisher.

13. The system of claim 11, wherein the second author is selected from the group consisting of a pedagogue, a professor, an instructor, a teacher, a teaching assistant, and a research assistant.

14. The system of claim 11, wherein one of the first author and the second author approves the merge.

15. The system of claim 11, wherein receiving from the first author the first modification to the discrete portion of the content further comprises identifying the discrete portion of the content using the unique identifier assigned to the element of the content.

16. The system of claim 11, wherein receiving from the second author the second modification to the discrete portion of the content further comprises identifying the discrete portion of the content using the unique identifier assigned to the element of the content.

17. The system of claim 11, wherein merging the first change set file and the second change set file into the medium further comprises identifying all modifications associated with the unique identifier assigned to the element of the content.

18. The system of claim 11, wherein the logical content store file separates content from business rules applied to the content.

19. The system of claim 11, wherein the definition file comprises metadata about the content, associations between content and other content within the definition file, and associations between content and content within another definition file.

20. The system of claim 11, wherein modification to a discrete portion of the content comprises: indicia of what content is being changed, indicia of why the content is being changed, a usage intent of the author, or a change intent.

* * * * *